US009575696B2

(12) United States Patent
Proehl et al.

(10) Patent No.: US 9,575,696 B2
(45) Date of Patent: Feb. 21, 2017

(54) PRINTING METHOD, ARRANGEMENT FOR THE REALIZATION OF THE PRINTING METHOD, AND A CORRESPONDING COMPUTER PROGRAM AND A CORRESPONDING COMPUTER-READABLE STORAGE MEDIUM

(71) Applicant: Cortado AG, Berlin (DE)

(72) Inventors: Mathias Proehl, Berlin (DE); Alexander Paschold, Berlin (DE)

(73) Assignee: Cortado AG, Berlin (DE)

( * ) Notice: Subject to any disclaimer, the term of this patent is extended or adjusted under 35 U.S.C. 154(b) by 0 days.

(21) Appl. No.: 14/724,042

(22) Filed: May 28, 2015

(65) Prior Publication Data
US 2015/0347068 A1 Dec. 3, 2015

(30) Foreign Application Priority Data
May 28, 2014 (DE) .................. 10 2014 210 230

(51) Int. Cl.
G06F 3/12 (2006.01)
(52) U.S. Cl.
CPC .......... *G06F 3/1222* (2013.01); *G06F 3/1204* (2013.01); *G06F 3/1212* (2013.01);
(Continued)
(58) Field of Classification Search
CPC .... G06F 3/1238; G06F 3/1204; G06F 3/1222; G06F 3/1288; G06F 3/1212; G06F 3/1292
(Continued)

(56) References Cited
U.S. PATENT DOCUMENTS

| 2012/0026536 A1* | 2/2012 | Shah | G06F 3/1206 358/1.15 |
| 2012/0038948 A1* | 2/2012 | Park | G06F 3/1204 358/1.15 |
| 2015/0153975 A1* | 6/2015 | Mori | G06F 3/1206 358/1.14 |

FOREIGN PATENT DOCUMENTS
WO  2011099997 A1  8/2011

OTHER PUBLICATIONS
"Xerox Mobile Print Solution Guide for Printing from EIP Enabled Device with Email Submission", Xerox Corporation, version 2.5 (2012).

* cited by examiner

*Primary Examiner* — Kent Yip
(74) *Attorney, Agent, or Firm* — Ewers & Hasselmann PLLC

(57) ABSTRACT

A printing method, an arrangement, a computer program, and a computer-readable storage medium are provided to increase a number of printing devices used by a mobile terminal. The mobile terminal communicates with a server via a wireless communication interface and sends via the server data to a printing device including information identifying the printing device and a key assigned to the printing device. The method includes establishing a communications link, determining printing devices, transmitting information about the usable printing devices, selecting a usable printing device, transmitting the data intended for printing or information that enable the server to retrieve the data intended for printing from a remote storage location in a data network, checking the validity of one or more of the keys transmitted from the mobile terminal transmitted, and transmitting, depending on the validity of the key(s), the data intended for printing to the selected printing device.

16 Claims, 2 Drawing Sheets

(52) U.S. Cl.
CPC .......... *G06F 3/1238* (2013.01); *G06F 3/1288* (2013.01); *G06F 3/1292* (2013.01)

(58) Field of Classification Search
USPC ...................................... 358/1.13, 1.14, 1.15
See application file for complete search history.

| User A | Printer object D1 | Printer 1 | Print setting 1 | Key A1 |
|---|---|---|---|---|
|  | Printer object D2 | Printer 1 | Print setting 2 | Key A2 |
|  | Printer object D3 | Printer 2 | Print setting 3 | Key A3 |
| User B | Printer object D1 | Printer 1 | Print setting 1 | Key B1 |
|  | Printer object D4 | Printer 3 | Print setting 4 | Key B2 |

PRINTING METHOD, ARRANGEMENT FOR THE REALIZATION OF THE PRINTING METHOD, AND A CORRESPONDING COMPUTER PROGRAM AND A CORRESPONDING COMPUTER-READABLE STORAGE MEDIUM

CROSS REFERENCE TO RELATED APPLICATIONS

This application claims foreign priority under 35 U.S.C. §119(a)-(d) to Application No. DE 102014210230.8 filed on May 28, 2014, the entire contents of which are hereby incorporated by reference.

FIELD OF THE INVENTION

The invention relates to a printing method, an arrangement for the realization of the printing method, a corresponding computer program, and a corresponding computer-readable storage medium, to increase the number of printing devices that can be used by a mobile terminal.

BACKGROUND

To send a print job to a printer from a mobile terminal running the operating system iOS (iPhone™ Operating System) has some limitations compared to fixed devices such as PCs or other mobile terminals such as laptops. Only printers using the protocol (interface software) AirPrint™ can be addressed. The printers are found via the protocol Bonjour™. These printers must be accessible via a wireless local area network (WLAN) and have a network address in the same segment as the mobile terminal. The printer must therefore be located in the vicinity of the mobile terminal from which the print job is started. The access rights to the printers are not uniformly regulated, so that each manufacturer is free to use and design a user administration. This printing solution for iOS-based mobile terminals is therefore only feasible in small environments, i.e. with typically a few to several tens of users and a few printers in a limited space. This concept places considerable demands on the management of printers and mobile terminals in larger environments where not every user should have access to every printer, because each new mobile terminal must be made known to every printer to which print jobs can be sent from mobile terminals. For this reason, in practice, the printers allow by default every mobile terminal to print. In this environment, it makes sense to install a server which runs the AirPrint™ protocol, receives the print job and forwards the print job to the appropriate printer. This would remove the restrictions on the accessibility of the printer. Rights management with this system is still cumbersome. Both methods, direct printing with AirPrint™ or indirectly via an AirPrint™ server, have some drawbacks that are overcome by the present invention:

Printing rights can typically be granted only to a device, but not to a user.

Printing rights for a mobile terminal can be set up only at the printer itself.

It depends on the printer whether and to what extent printing rights can be awarded to a device or to a user. A comprehensive management for all users and devices is only possible when all printers enable user and device management.

The necessary administrative work must be done on the device itself, because the user interface is not standardized. At best, a rudimentary configuration server is installed on the printer, allowing the administrator to access the printer over the network. However, this does not solve the problem associated with the different user interfaces of different printers.

When no printing rights are awarded, each terminal is authorized to send print jobs to this printer. Or a printer does not accept a print job, which depends on the default setting of the printer.

The user has no control over his rights and the available devices. The AirPrint™ protocol offers him all available printers; however, the user learns only after starting the print job whether he is authorized to use the printer.

A typical scenario in an AirPrint™ environment looks like this:

1. The administrator has defined access rights on the printers.
2. The user selects the print function on his iOS device.
3. The device offers him to all printers that have been offered via the AirPrint™ protocol.
4. The user selects a printer.
5. The print job is sent to the printer.
6. If the printer accepts the job, printing begins. Otherwise, an error message is outputted and the user must repeat step 4.
7. Search for the printer to collect the print job.

SUMMARY

An object of the invention is therefore to provide a printing method, an arrangement for realizing the printing method as well as a corresponding computer program, and a corresponding computer-readable storage medium, which eliminate the disadvantages of the known solutions and facilitate printing, in particular from mobile terminals.

According to an aspect of the present invention, the number of printing devices usable for mobile terminals is increased. This is achieved by providing a printing method where a mobile terminal, for example a mobile terminal on which the operating system iOS is installed, communicates over a wireless communication link with a server. The communication can utilize any known or yet to be developed communication protocol, in particular communication protocols which allow the use of printing devices only in a limited environment, for example limited to certain network addresses of the printing devices, as is the case for example with the AirPrint™ protocol. (When using the invention, the server would thus need, for example, a corresponding network address, but no longer the printing devices supported by the server.) According to an aspect of the invention, data to be printed are sent from the mobile terminal via the server to a printing device.

Furthermore, according to a further aspect of the invention, data are stored on the mobile terminal, which include at least information about a printing device or a plurality of printing devices and keys, wherein at least one key is assigned to each printing device. These data may have been originally generated on the data processing device, on which the server is installed, or on another data processing device. Preferably, the keys are also associated with a user so that by generating the data, a user profile is created on the server or on the other data processing device that includes information about printing devices that can be used by a particular user, and keys associated with the printing device. Preferably, the keys are user-specific, so that each key is associated with a single user (awarded to a single user). (The data that include at least information about one or more printing devices and keys are referred to in the following as user profile. A user profile is thus assigned to a user.) The data can be transmitted to the mobile terminal by automatic or semi-automatic transmission or by manual retrieval from the data processing device on which the server is installed, or from the other data processing device. For example an email server, a web server or a server for the mobile terminal management (MDM Server) that sends the user profile to the mobile terminal can be installed on the other data processing device. The other data processing device will be referred to hereinafter also as communication server.

When content is to be printed from the mobile terminal, a communication link is established according to the invention between the mobile terminal and the server. Preferably, the mobile terminal communicates with the server via a wireless communication interface. The communication link thus has at least partially wireless communication paths. In a preferred embodiment, the connection to the server is established in response to the activation of a print function on the mobile terminal, for example, after a user has actuated on the mobile terminal a print button of an application, such as Microsoft™ Word. Preferably, when the connection is established or (shortly) after the connection is established, at least one key is transmitted to the server. In a preferred embodiment, once the connection between the mobile terminal and the server is established, the available printing devices that can be used to print the content are detected by the server. During this detection it is, inter alia, checked whether a printing device can technically be accessed from the server. Preferably, it is also checked on the server, whether the at least one key transmitted by the terminal is valid for the user and/or for the existing printing devices.

Subsequently, information about at least a subset of the usable printing devices is transmitted from the server to the mobile terminal. This information is used by the user of the mobile terminal to select a suitable printing device on which the content is to be printed. Usable in this context means that the printers can be used by the user, i.e. all technical conditions to initiate a printing operation on this device are met. It is known from the prior art to convey to the mobile terminal information about printers in the user profile. These printers are always offered to the user as soon as the user initiates printing. It is not checked whether the printers can be accessed. For example, these devices may have been removed, the administrator may have assigned a new address or a new name, or the printers have simply been turned off. The user is made aware of this situation in the prior art only by an error message. In this regard, the present invention expands here the state of the art, since these printers are filtered out during a check on the server.

According to a preferred embodiment, at least some of the keys are included in the network name of the printer. When a user has selected a printing device, has set the print settings and has enabled printing, the key is transmitted to the server in the network name of the printer, wherein the key and the selected printing device are extracted from the network name. The authorization of the user to use the printing device and/or the set printer settings is checked based on the key. If the user is authorized, the print data are sent to the determined printing device. However, the key can also be transmitted from the terminal to the server via alternate paths, for example, as parameters within the communication protocol.

In a preferred embodiment, printer objects are created on the server, with each printer object addressing a printing device. According to a preferred embodiment, the printer objects define print settings. This has the particular advantage that different printer objects are thus created for a printing device, which differ according to the print settings or the name of the printer object. Furthermore, the printer objects may advantageously be associated with a user. In this manner, a first printer object that addresses a first printing device provides first print settings and is associated with a first user, and a second printer object that also addresses the first printing device, but provides second print settings and is associated with the first or a second user may be provided. Preferably, the information regarding at least a part of the usable printing devices include the printer objects that are associated with the user and address usable printing devices. The printer objects are thus preferably created user-specific.

After selection of the printing device, information about the selected printing device and optionally additional information about print settings and the data or information provided for printing which can be used by the server to obtain the data provided for printing from a remote storage location are transmitted from the mobile terminal to the server. In a preferred embodiment of the invention, the printer objects can be provided to the user of the mobile terminal to activate the print function (and transmission of printer objects). After selecting a printer object, the user has the option to define print settings or change preferences for print settings. After the printing device has been selected via the corresponding printer object and the print settings have been made, the selection and the print settings are confirmed and transmitted to the server along with the data provided for printing and key assigned to the printer object. In another embodiment, instead of the data provided for printing, information may be sent to the server that enables the server to retrieve the data provided for printing from a remote storage location in a data network. The information that enables the server to retrieve the data may include, for example, a network address of the data, such as Uniform Resource Locator (URL).

According to a preferred embodiment, the server may check whether the key sent by the device is valid for the selected printing device, the user and/or the print settings. If the key is determined to be valid, the data designated for printing are sent to the selected printing device where they are printed out.

According to a preferred embodiment, at least a portion of the names of the printing devices and keys contained in the user profile of the user are transmitted to the server immediately after the connection between the mobile terminal and the server has been established (in response to the activation of the print function) and the server has identified the (currently) printing devices available for the transmitted printing device names for which a valid key had been sent. This has the advantage that then only the particular information concerning those printing device for which a valid key is available is transmitted for the user from the server to the mobile terminal. In addition, the validity of the key can be re-examined after performing the print settings even when the print settings are linked to a valid key.

According to another preferred embodiment, a special server with a user administration may be used for managing the user profiles and for checking the keys. The server with the user administration may be located in the communication link between the mobile terminal and the print server so that all communication between the mobile terminal and the print server runs via the server with the user administration. However, the server with the user administration may also be accessible only from the print server. In any case, the print server communicates with the server with the user administration to obtain information on whether the data provided for printing are allowed to be sent to the selected printing device. In a preferred embodiment, the data provided for printing will be converted into a format matched to the selected printing device before transmission to the selected printing device.

The invention may be implemented, for example, by a method for printing from mobile terminals via a wireless connection to network printers by using at least one print server, wherein printer objects, which are offered to the central user administration as a printer, are set up on the print server, a list of users and a list of available printers is made available in a central user administration, a dedicated list of printers for each user is provided in the central user administration, a unique key is created for each combination of user and printer, the list of printers assigned to the user together with the keys is transmitted from the print server to the mobile terminal used by the user to log in the system, the key is transmitted to the print server with every print job, and the print server in the central user administration checks the key after a printer has been selected and the print job has been sent to the print server, and the print server forwards the print job to the selected printer.

The server which transmits the printer list to the mobile terminal may be an email server, a web server or an MDM Server and the mobile terminals may be devices with the operating system iOS.

The communication between the mobile terminal and print server may use the AirPrint™ protocol.

An arrangement according to an aspect of the invention has at least one chip and/or processor and is configured to execute a printing method, wherein a mobile terminal communicates with a server via an interface for wireless communication and sends via the server data intended for printing to a printing device, wherein data are stored on the mobile terminal which include information identifying at least one printing device and at least one key associated with the printing device, and wherein the method includes the following steps:

establishing a communications link between the mobile terminal and the server, determining, on the server, usable printing devices, sending from the server to the mobile terminal information concerning the usable printing devices, selecting, on the mobile terminal, a usable printing device, sending from the mobile terminal to the server the data intended for printing or information that enable the server to retrieve the data intended for printing from a remote location in a data network, before sending the specific data intended for printing to the selected printing device, examining on the server the validity of one or more keys sent from the mobile terminal, and depending on the validity of the key(s), sending the data intended for printing to the selected printing device.

The description of the method steps shall not determine any order for their execution. In particular, the keys transmitted from the mobile terminal can also be checked immediately after the communication link between the mobile terminal and the server has been established.

A computer program according to an aspect of the invention allows a data processing device, after it has been loaded into the memory of the data processing device, to perform a printing operation, wherein a mobile terminal communicates with a server via an interface for wireless communication and sends data intended to be printed via the server to a printing device, wherein data are stored on the mobile terminal, which include information designating at least one printing device and at least one key associated with a printing device, and wherein the method includes the following steps:

establishing a communications link between the mobile terminal and the server, determining, on the server, usable printing devices, sending from the server to the mobile terminal information concerning the usable printing devices, selecting, on the mobile terminal, a usable printing device, sending from the mobile terminal to the server the data intended for printing or information that enable the server to retrieve the data provided for printing from a remote location in a data network, before sending the data intended for printing to the selected printing device, examining on the server the validity of one or more keys sent from the mobile terminal, and depending on the validity of the key(s), sending the data intended for printing to the selected printing device.

According to another preferred embodiment of the invention, the computer program according to the invention is of modular construction, wherein individual modules are installed on different data processing devices.

Advantageous embodiments contemplate in addition computer programs configured to execute additional method steps or procedures specified in the description.

Such computer programs may be provided, for example, for downloading (for a fee or free of charge, freely accessible or password-protected) in a data network or a communication network. The provided computer programs may be used by a method, wherein a computer program according to claim 8 is downloaded from an electronic data network, for example from the Internet, to a data processing device connected to the data network.

To perform the method according to an aspect of the invention, a computer-readable storage medium is employed on which a program is stored which enables a data processing device, after the program has been loaded into the memory of the data processing device, to perform a printing operation wherein a mobile terminal communicates via an interface for wireless communication with a server and sends to a printing device via the server data intended for printing, wherein data are stored on the mobile terminal that include information designating at least one printing device and at least one key associated with the printing device, and wherein the method includes the following steps:

establishing a communications link between the mobile terminal and the server, determining, on the server, usable printing devices, sending from the server to the mobile terminal information concerning the usable printing devices, selecting, on the mobile terminal, a usable printing device, sending from the mobile terminal to the server the data intended for printing or information that enable the server to retrieve the data provided for printing from a remote location in a data network, before sending the data intended for printing to the selected printing device, examining on the server the validity of one or more keys sent from the mobile terminal, and depending on the validity of the key(s), sending the data intended for printing to the selected printing device.

By using the method according to the invention, inter alia, the user is still presented with the familiar environment for printing while avoiding the shortcomings of the prior art. The user will go through the same steps 1-7, as described above as a typical scenario for an AirPrint™ environment, except for the step 1. The termination at step 6 is also excluded by the invention.

BRIEF DESCRIPTION OF THE DRAWINGS

Example embodiments will now be described with reference to the drawings.

DETAILED DESCRIPTION

Figures 1, 2:
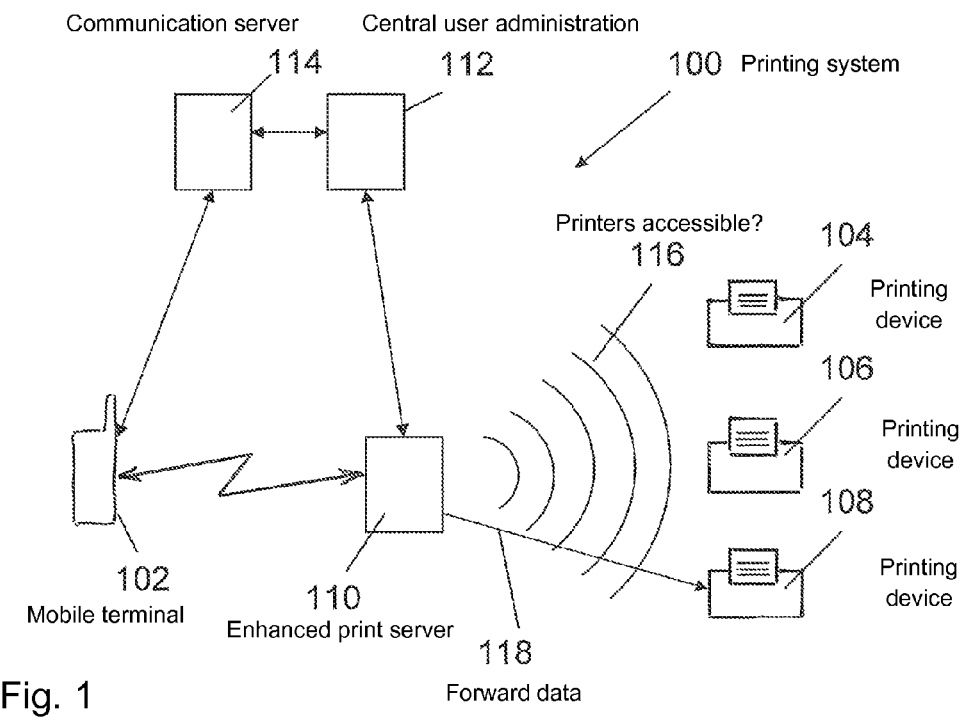
FIG. 1 shows a system for carrying out the printing method according to an example embodiment.
FIG. 2 shows a user profile according to an example embodiment.

Example embodiments of a network will be described hereinafter which is configured to perform a method according to an example embodiment. However, the invention is not limited to the example embodiment of the network or the example embodiment of the method Instead, the method according to the example embodiment can also be carried out with differently configured networks or by using methods that include other method steps. For example, the print server 110, the communication server 114 and/or the central user administration 112 shown in FIG. 1 can also be installed on a data processing device. Likewise, the print server 110 may be provided with information that enables the print server 110 to check the validity of the key without a connection to the central user administration 112. The validity of the key can also be checked at any time between the user logs in the network and the data for printing are transmitted to the selected printing device 108.

In addition to the components already described in conjunction with the prior art, namely the mobile terminal 102, the printing devices 104, 106, 108, and the server capable of executing the AirPrint™ protocol (AirPrint™ server), a central user administration 112 and a communication server 114 are introduced in an example embodiment of printing system 100. According to the example embodiment, the AirPrint™ server is equipped with additional functionalities which relate primarily to the user administration and key check. The AirPrint™ server with these additional functionalities is hereinafter referred to as enhanced print server 110. The communication server 114 transmits the user profiles 200 to the mobile terminal 102. This server 114 may be a MDM server, a web server or an e-mail server; however, any other technical device which transmits the user profiles 200 to the terminal 102 is also possible.

The central user administration 112 replaces the rights management that needed to be carried out up to now on each individual printing device 104, 106, 108 for each mobile terminal 102. It also provides additional advantages, namely decoupling user and terminal 102. Any user who has logged on with a mobile terminal 102 to the central user administration 112 is able to use the printing devices 104, 106, 108 assigned to him, regardless of the used mobile terminal 102.

Figure 3:
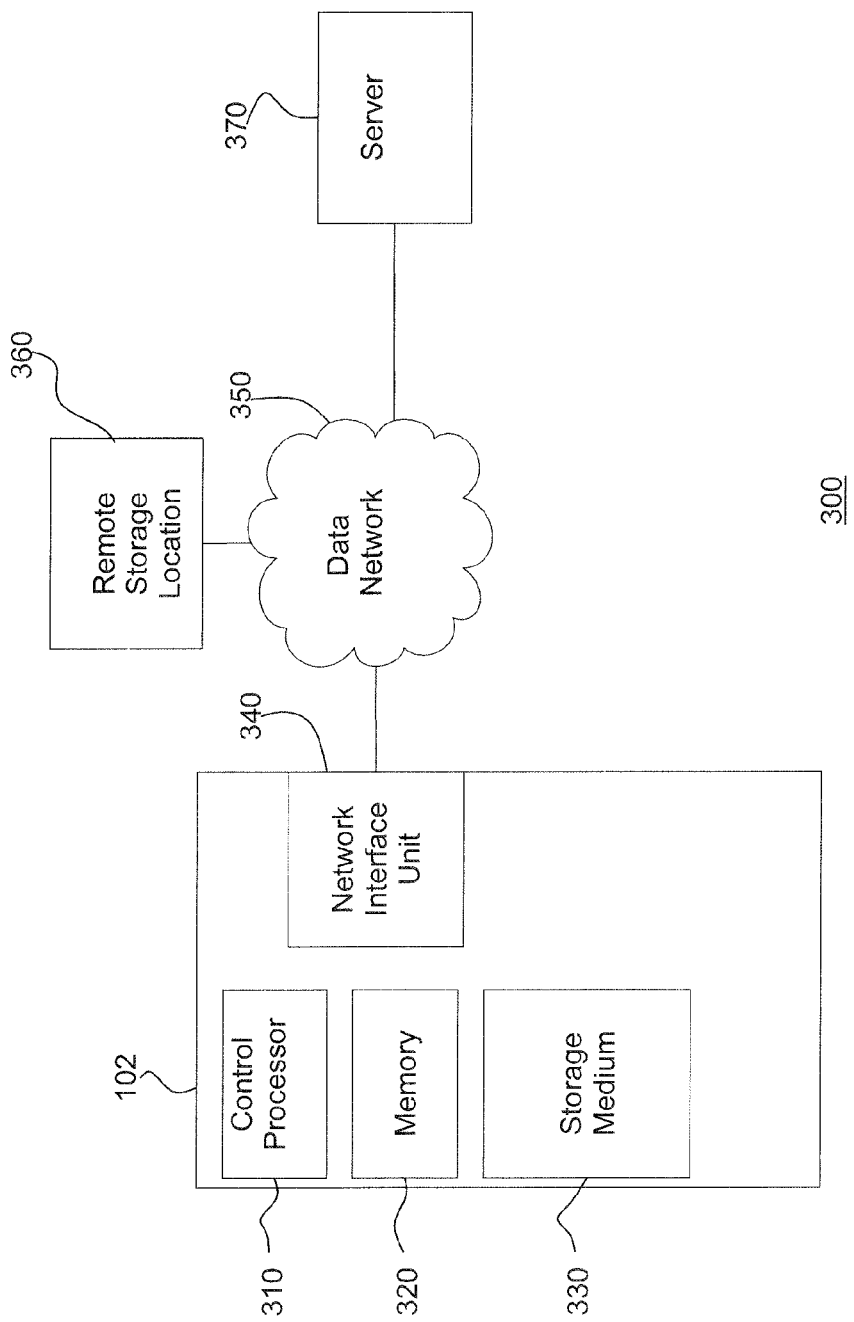
FIG. 3 is a diagram of a network environment in which the print techniques presented herein may be used according to an example embodiment.

FIG. 3 shows mobile terminal 102 in network environment 300. Mobile terminal 102 includes control processor 310, memory 320, non-transitory computer readable storage medium 330, and network interface unit 340. FIG. 3 also shows data network 350 to which mobile terminal 102 is connected via network interface unit 340, e.g. a wireless communication interface. In addition, FIG. 3 shows remote storage location 360 and server 370 connected to mobile terminal 102 via data network 350. Returning now to FIG. 1. In the prior art, to even perform printing rights management, a terminal 102 must be registered at each printing device 104, 106, 108 to be used. The user was thus tied to a particular terminal 102, if he wanted to use his preferred printing devices 104, 106, 108. In the presented method according to an example embodiment, although registration is still required, this registration is carried out once in the system 100 and applies to all printing devices 104, 106, 108 and all mobile terminals 102 used by the user. The central user administration 112 contains a list of printing devices and users. A list of printing devices 104, 106, 108 is administered for each user. In addition, a unique key is created for each combination of a user with a printing device 104, 106, 108. The prior art is here already surpassed several times, administration of the user is separated from the terminal 102, the complicated rights management at the individual printing devices 104, 106, 108 is replaced by a central entity, namely the central user administration 112, and the connection of a user to a printing device 104, 106, 108 is protected by a key.

The print server 110 is centrally responsible for managing the print jobs of all users and communicates with the mobile terminals 102 via the AirPrint™ protocol. The print server 110 also maintains a connection to the central user administration 112 in order to check the validity of the keys. This check is not known from the prior art.

Different printer objects that address the same printing device 104, 106, 108, but have different the print settings, can be created on the print server 110. Also possible are different printer objects with the same settings, for example, in order to be able to assign to meaningful names. These printer objects are managed in the central user administration 112 as a printer and transmitted by the communication server 114 as a printer to the terminal 102. In this way, for example, the same printing device 104, 106, 108 can be assigned to several users, whereas the print settings can be individually set for each user. For example, user A is able to print in color, whereas user B can print on the same printing device 104, 106, 108 only in black and white. This is implemented by way of two different printer objects that are stored as different printers in the central user administration for the different users. Likewise, printer objects with different characteristics for a printing device 104, 106, 108 can be set up a user. Thus, the user has several printers available that print on the same printer device 104, 106, 108, albeit with different characteristics; for example, user A gets two printers D1 and D2 , wherein D1 prints in color and D2 prints in black and white, with the print data being at the end sent by the print server 110 to the same printing device 104, 106, 108. According to the invention, the settings are not limited to those described here. Each setting or combination of settings that can be applied to a printing device 104, 106, 108 can form its own printer object in conjunction with with a printer. A printing device 104, 106, 108 can be used in any number of printer objects, while a printer object appears in the central user administration exactly as one printer. FIG. 2 shows two exemplary user profiles 200 that illustrate such printer objects such as combinations of printing device 104, 106, 108, print settings and key. The printer objects are then associated with the users in the central user administration 112. A further advantage over the prior art is the greater number of available printing devices 104, 106, 108. Since the printing device 104, 106, 108 no longer communicate with the mobile terminal 102, all printing devices 104, 106, 108 can be used for which a driver exists on the print server 110. The manufacturers implement the Airprint™ protocol as an additional protocol in addition to a proprietary protocol or another standard protocol. The present state of the art hence limits the user to a smaller number of printing devices 104, 106, 108.

The communication server 114 creates in conjunction with the central user administration 112 a user profile 200 with the printers (print objects on the print server 110) set up for this user. The user profile 200 with the list of the printers and the keys can be transmitted to the mobile terminal 102 currently being used by the user in three ways:

Automatic transmission: When the user logs in the system 100, the communication server 114 transmits the user profile 200 to the terminal 102. This is for example the case when an MDM Server is used.

Semi-automatic transmission: Once the user has logged in the system 100, the communications server 114 transmits to the user a message with data of the user profile 200, or at least a reference to the data. This can be done, for example, with an email. The user is then free to use the received data.

Manual request: The user must actively request the data of the user profile 200 from the communication server 114. This is for example possible with an email or a specific web page. After the user has done this, the process will continue with a semi-automatic transmission.

The user can log in, for example, via an LDAP server (LDAP: Lightweight Directory Access Protocol) and the like. It is only important for the method according to the invention that the central user administration 112 and the communication server 114 have knowledge of the registration and the communication server 114 is able to communicate with the terminal 102 used for the registration in order to transmit the user profile 200.

In the prior art, the printing devices found by the AirPrint™ protocol are displayed on the mobile terminal 102, which the present invention can also not prevent. To prevent the use of these printing devices and to thus ensure the use of the invention, print jobs can either be declined from all printing devices, i.e. devices with the exception of the print server 110, or the AirPrint™ functionality is disabled on the printing device 104 106, 108. The second method is preferable, since then only the printing devices 104, 106, 108 according to an example embodiment are displayed on the terminal 102. The method according to the invention does not prevent a display of all printing devices found by AirPrint™/Bonjour™.

A process flow of a printing operation according to an example embodiment is as follows:

The administrator has stored the user and the printing devices 104, 106, 108 assigned to the user in the central user administration 112.

The user logs in the system 100 with his mobile terminal 102.

The user receives a list of printers together with the keys.

The user activates the print function.

Before the list of printers is displayed, the client sends this list along with the keys to the print server 110.

The print server checks in step 116 whether the printing devices 104, 106, 108 contained in the list are currently accessible. The communication between the print server 110 and the printing devices 104, 106, 108 may be wireless or wired or via a combination of wireless and wired communication links.

Non-responsive printing devices 104, 106, 108 are removed from the list.

The print server 110 checks in conjunction with the central user administration 112 the validity of the key.

The list of active printing devices 104, 106, 108 with a valid key is returned to the client.

The user selects a printer.

The print data are transmitted to the print server 110.

The print server 110 prepares the data for the selected printing device 108 and forwards these data to selected printing device 108 in a step 118.

The invention is not limited in its embodiment to the example embodiments described above. Rather, a number of variants are conceivable, which make use of the printing method according to the example embodiments, the arrangement according to the example embodiments, the computer program according to the example embodiments or the computer-readable storage medium according to the example embodiments even in fundamentally different example embodiments.

What is claimed is:

1. A printing method for printing from a mobile terminal on a printing device, the method comprising:
at the mobile terminal, establishing a wireless communications link between the mobile terminal and a server;
receiving information about usable printing devices from the server;
said information about the usable printing devices indicating that the usable printing devices are accessible by the server and that a user of the mobile terminal is authorized to print on the usable printing devices;
selecting at least one usable printing device based on the information received from the server;
subsequent to the selecting of the at least one usable printing device, transmitting to the server:
information identifying the at least one usable printing device selected from the usable printing devices,
at least one key assigned to a combination of the at least one usable printing device and the user of the mobile terminal, and
data to be printed on the at least one usable printing device or information that enables the server to retrieve the data to be printed on the at least one usable printing device from a remote storage location in a data network.

2. The printing method according to claim 1, wherein the at least one usable printing device is selected in response to an activation of a print function on the mobile terminal.

3. The printing method according to claim 1, further comprising:
receiving printer objects at the mobile terminal, said printer objects identifying the usable printing devices.

4. The printing method according to claim 3, wherein each of the usable printing devices is associated with a plurality of printer objects, and
wherein each of the plurality of printer objects defines different print settings.

5. The printing method according to claim 3, wherein each of the printer objects is associated with a user.

6. The printing method according to claim 1, wherein the at least one key is included in an address of the at least one usable printing device.

7. A mobile terminal comprising:
one or more processors;

one or more memory devices in communication with the one or more processors;

at least one network interface unit coupled to the one or more processors;

said one or more processors being configured to:

establish a wireless communications link between the mobile terminal and a server;

receive from the server information about usable printing devices;

said information about the usable printing devices indicating that the usable printing devices are accessible by the server and that a user of the mobile terminal is authorized to print on the usable printing devices;

select at least one usable printing device based on the information received from the server;

subsequent to the selecting of the at least one usable printing device, transmit to the server:

information identifying the at least one usable printing device selected from the usable printing devices, at least one key assigned to a combination of the at least one usable printing device and the user of the mobile terminal, and data to be printed on the at least one usable printing device or information that enables the server to retrieve the data to be printed on the at least one usable printing device from a remote storage location in a data network.

8. The mobile terminal according to claim 7, wherein the at least one usable printing device is selected in response to an activation of a print function on the mobile terminal.

9. The mobile terminal according to claim 7, said one or more processors being configured to receive printer objects, wherein the printer objects are associated with and identify the usable printing devices, wherein each of the usable printing devices is associated with at least two printer setting objects, and wherein each of the at least two printer setting objects defines different print settings.

10. The mobile terminal according to claim 9, wherein each of the printer objects is associated with a user.

11. The mobile terminal according to claim 7, wherein the at least one key is included in an address of the at least one usable printing device.

12. A computer program which is embodied in a non-transitory computer readable storage medium and comprises program instructions, wherein the computer program enables a data processing device, after the program instructions have been loaded into a memory of the data processing device, to execute the printing method according to claim 1.

13. A non-transitory computer readable storage medium on which a computer program with program instructions is stored, wherein the computer program enables a data processing device, after the program instructions have been loaded into a memory of the data processing device, to execute the printing method according to claim 1.

14. A printing method for printing from a mobile terminal on a printing device, the method comprising:

at a server, establishing a wireless communications link between the mobile terminal and the server;

classifying printing devices as usable printing devices;

transmitting information about the usable printing devices to the mobile terminal;

said information about the usable printing devices indicating that the usable printing devices are accessible by the server and that a user of the mobile terminal is authorized to print on the usable printing devices;

subsequent to the transmitting of the information to the mobile terminal, receiving from the mobile terminal:

information identifying at least one usable printing device selected from the usable printing devices, at least one key assigned to a combination of the at least one usable printing device and the user of the mobile terminal, and data to be printed on the at least one usable printing device or information that enables the server to retrieve the data to be printed on the at least one usable printing device from a remote storage location in a data network;

determining a validity of the at least one key, and depending on the validity of the at least one key, transmitting the data to be printed to the at least one usable printing device.

15. The printing method according to claim 14, further comprising:

generating printer data identifying the usable printing devices; and transferring the printer data to the mobile terminal.

16. The printing method according to claim 14, further comprising:

maintaining printer data identifying the usable printing devices on a data processing device on which the server is executed or on another data processing device, and transferring the printer data to the mobile terminal.

* * * * *